United States Patent [19]

Mesher

[11] Patent Number: 4,665,455
[45] Date of Patent: May 12, 1987

[54] DISKETTE SEQUENTIAL TRANSPORT APPARATUS

[75] Inventor: Mark Mesher, Wakefield, Mass.

[73] Assignee: Modular Robotics, Lynnfield, Mass.

[21] Appl. No.: 460,316

[22] Filed: Jan. 24, 1983

[51] Int. Cl.$^4$ .............................................. G11B 5/012
[52] U.S. Cl. ..................................... 360/98; 271/131; 271/279; 414/332; 414/417
[58] Field of Search .................................... 360/97–99; 414/331–332, 417; 271/131, 137, 279; 369/191–195

[56] References Cited

U.S. PATENT DOCUMENTS

| | | |
|---|---|---|
| 2,699,862 | 1/1955 | Walter . |
| 2,899,043 | 8/1959 | Young . |
| 3,305,087 | 2/1967 | Lucker . |
| 3,792,857 | 2/1974 | Bubley et al. . |
| 3,860,231 | 1/1975 | Oltra . |
| 3,907,305 | 9/1975 | Paul .................. 369/191 X |
| 4,004,797 | 1/1977 | Schoppee . |
| 4,058,307 | 11/1977 | Bubley et al. . |
| 4,157,139 | 6/1979 | Bjork . |
| 4,170,031 | 10/1979 | Beuch et al. . |
| 4,173,427 | 11/1979 | Beuch et al. . |
| 4,195,321 | 3/1980 | Chelin et al. . |
| 4,226,570 | 10/1980 | Holecek et al. . |
| 4,245,266 | 1/1981 | Bauer . |
| 4,246,618 | 1/1981 | Bauer . |
| 4,510,542 | 4/1985 | Aggeler .................. 360/98 |

FOREIGN PATENT DOCUMENTS

56-11651  2/1981  Japan .................. 369/191

Primary Examiner—A. J. Heinz
Attorney, Agent, or Firm—Cesari and McKenna

[57] ABSTRACT

Sequential diskette transport apparatus of the reciprocating type transports diskettes one after the other from a hopper to a disk drive where the disk component of each diskette can be operated on. The apparatus then retrieves each diskette in turn from the disk drive and transports it to a receiving location where diskette sorting may take place. The apparatus also includes a special disk drive mount by which a disk drive can be quickly positioned in the apparatus at exactly the correct location to receive diskettes and which gives ready access to the underside of the disk drive for maintenance purposes. The apparatus transports the diskettes using special pickers which push only the lowest diskette in the hopper into the disk drive and then retrieves the diskette from the drive using a pulling motion. Thus, the apparatus handles the diskettes in more or less the same way as they would be handled by an operator if the loading and unloading processes were done manually.

17 Claims, 15 Drawing Figures

DISKETTE SEQUENTIAL TRANSPORT APPARATUS

BACKGROUND OF THE INVENTION

1. Field of the Invention

This invention relates to diskette sequential transport apparatus. It relates more particularly to apparatus for transporting diskettes from a stack one after the other to a disk drive where each diskette may be evaluated or certified or otherwise operated on. The apparatus then transports each diskette from the disk drive to any one of a number of receiving locations.

The magnetic diskettes handled by the present apparatus, known in the trade as floppy disks, comprise a plastic or cardboard envelope inside of which is positioned a flexible magnetic disk. One such diskette of this general type is disclosed in U.S. Pat. No. 3,668,658. The diskettes come in a plurality of sizes, the most common having a five and one-quarter and an eight inch disk.

2. Description of the Prior Art

There already exist various apparatus for handling and transporting diskettes. U.S. Pat. Nos. 4,173,427 and 4,226,570 disclose transports for pulling diskettes from a magazine to a final position at which data transfer may take place, after which the diskette is returned to the magazine. In that prior machine, the diskettes have to be arranged in the magazine on edge. Clothespin type grippers clamp onto the diskette and pull the diskette from the magazine to the disk drive. After competion of the read or write operation, the diskette is transported back to its original location in the magazine.

That apparatus includes no provision for sorting the diskettes depending upon their performances in the disk drive. Also the transporting of each diskette to the read/write location using pulling clothespin-type grippers is not the most desirable way of achieving accurate positioning of the diskette in the disk drive. Rather, it would be preferable if such apparatus mimicked the action of a human when so positioning the diskette. That is, when loading a diskette manually, the operator invariably pushes against the rear or trailing edge of the diskette with his finger or thumb. Such pushing motion against the stiffest part of the cassette assures that the diskette is seated firmly and properly in the disk drive without damage to the diskette. To withdraw the diskette from the drive, the operator usually grips the edge of the diskette with his thumb and forefinger and pulls it out of the drive. Instead of handling the diskette in that customary way, that prior transport does just the reverse.

U.S. Pat. No. 4,195,321 discloses transport apparatus comprising a loading stacker and a receiving stacker mounted alongside a disk drive. A selectively operable slider transfers each diskette one at a time from the loading stacker to the disk drive and also retrieves each diskette from the disk drive for conveyance to the receiving stacker. That prior apparatus is relatively complicated comprising, as it does, numerous levers and cranks to effect the proper movement of the diskettes. Moreover, it requires dual drives, one for loading and one for stacking. Also, it has no provision for sorting the diskettes following their treatments at the read/write location; the diskettes are all routed to the same receiving stack.

The prior apparatus disclosed in the aforementioned patents have other drawbacks as well. As far as can be determined, they can only handle a single size diskette. Also, such apparatus must be mounted in juxtaposition to the associated disk drive so that the diskettes can be transported to and retrieved from the disk drive in a reliable fashion. Once mounted and aligned with a particular drive, it becomes difficult to maintain or repair that drive in the event of a malfunction or to replace the drive if that becomes necessary.

These and other apparatus of this general type of which we are aware are disadvantaged also in one or another of the following respects: they are excessively complicated and expensive, they are difficult to make and to maintain properly, and their operation is not as reliable as might be desired.

SUMMARY OF THE INVENTION

Accordingly, the present invention aims to provide apparatus for sequentially transporting diskettes from a stack to a disk drive and then retrieving each diskette from the drive and routing it to one of a plurality of locations depending upon its performance in the disk drive.

Another object of the invention is to provide transport apparatus of this type which reliably positions each diskette properly in the drive unit.

A further object of the invention is to provide a such apparatus which can accommodate different size diskettes.

Another object of the invention is to provide apparatus of this type which is relatively easy and inexpensive to make and to maintain.

Yet another object of the invention is to provide such transport apparatus which can be used in conjunction with a variety of different standard disk drives.

A further object of the invention is to provide such apparatus which properly positions the associated disk drive to receive the diskettes being handled by the apparatus.

Still another object of the invention is to provide apparatus of this type which permits ready and easy access to the associated disk drive for purposes of maintenance, repair and replacement.

Yet another object of the invention is to provide sequential diskette transport apparatus which operates reliably despite minor dimensional variations in the diskettes being handled or in the relative positions of the transport and the associated disk drive.

A further object is to provide diskette transport apparatus which automatically inserts diskettes into and retrieves them from an associated disk drive in a manner that mimics such insertion and retrieval done manually.

Still another object is to provide diskette transport apparatus which is easy to operate by the average worker.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, the present apparatus includes a base which supports a diskette hopper capable of containing a large number (e.g., in excess of 100) of diskettes positioned flush against one another in a stack. Juxtaposed to the hopper at one side thereof is a diskette drive mount removably coupled to the base. The mount is arranged to support any one of a variety of different standard floppy disk drives that are presently available on the market.

Slidably mounted to the base is a carriage which travels on tracks underneath the hopper from an advanced position adjacent the disk drive mount and a retracted or home position spaced on the opposite side of the hopper from that mount. The carriage is moved between its two positions by a simple belt drive mounted to the base.

A pair of special diskette pickers are mounted to the carriage at laterally spaced-apart locations thereon. Each picker has a fixed relatively long lower finger and a shorter upper finger movable toward and away from the lower finger and an abutment between the two fingers which is set back from their free ends. When the carriage is moved from its retracted position to its advanced position, these pickers are in their open conditions with their upper fingers spaced from the corresponding lower fingers, exposing the abutments. The upper fingers are positioned to engage the trailing edge of only the lowest diskette in the stack contained in the hopper and to push that diskette through a slot in the side of the hopper toward the disk drive mount or, more particularly, toward the disk drive supported by that mount.

After the trailing edge of the diskette exits the hopper slot, that edge drops down onto the longer lower fingers of the pickers and the picker abutments continue to push the diskette toward the disk drive. With the diskette positioned thusly on the lower fingers of the pickers, it is already aligned within the open receiving slot or carrier of the disk drive so that as the carriage is moved to its fully advanced position, the diskette is pushed further into the carrier of the disk drive until it seats firmly at the proper location to be engaged by the disk drive spindle. Following this, the carriage is retracted to a stand-by location along its track so that the pickers are clear of the disk drive. Then the diskette carrier of the drive is moved to its closed or operating position to permit a read and/or write operation to be performed on the diskette.

After that operation is completed and the disk carrier opens, the apparatus carriage is moved again to its advanced position so that the picker lower fingers slide under the opposing edge of the diskette. Then the pickers are actuated to move the picker upper fingers toward the lower fingers thereby clamping the diskette against the lower fingers. Following that, the carriage is moved toward its retracted position, thereby withdrawing the diskette from the disk drive.

With the diskette clamped against the lower picker fingers and supported only by the pickers, sufficient clearance exists between the withdrawing diskette and the diskette stack in the hopper to permit the diskette to be pulled along under the hopper toward the retracted position of the carriage. Before the carriage reaches that position, however, the pickers are actuated to open their fingers thereby dropping the diskette into a receiving location such as a bin supported by the base below the hopper. In a preferred embodiment of the apparatus, when the disk drive is being used for certification or evaluation of the disks in the diskettes, at least two such bins are suspended from the base and the diskette is guided to one or the other of these bins depending upon whether it passed or failed certification in the disk drive. The routing of the diskette to the bins is controlled by the position of appropriate gates mounted to the base below the hopper as will be described in more detail later.

In the meantime, the apparatus carriage is moved to its retracted position, with the picker fingers in their open positions ready to transport the next diskette from the hopper to the disk drive.

The apparatus can be operated in a manual mode so that, by depressing a LOAD button, the carriage is moved from its retracted position to its advanced position and thence to its standby position where it remains. By depressing an UNLOAD button, the carriage is moved from its standby position to its advanced position again and finally to its retracted position. Alternatively, the apparatus can be operated in an automatic mode so that the apparatus cycles continuously in response to signals from a controller associated with the disk drive, transporting disks from the hopper to the disk drive one by one until the hopper is empty, sorting the disks in the process so that the acceptable disks are collected in one bin, while the unacceptable disks are collected in another bin. For diagnostic purposes, it is even possible to control each movement of the carriage separately.

The present apparatus is quite compact and convenient to use. The disk drive is mounted very close to the hopper so that the overall apparatus takes up a minimum amount of space. Furthermore, the drive mount is arranged so that it can be dropped into appropriate receptacles in the base with the result that the drive is assuredly aligned with the hopper and in the correct position to receive the diskettes being transported from the hopper.

Most conveniently, each disk drive being used with the apparatus is fitted with its own mount. Therefore, substitution of one drive for another simply involves lifting one mounted drive away from its location on the base and placing another mounted drive on the base. Such substitution may take place, for example, when handling or certifying different sized diskettes. To switch from an 8 inch to a 5¼ inch diskette size, one simply lifts the mount supporting the 8 inch drive from the base and substitutes a mounted 5¼ inch drive. Then an insert is positioned in the hopper whose dimensions accommodate a stack of 5¼ inch diskettes. In all other respects, the operation of the apparatus is the same for both size diskettes. The present apparatus is further advantaged in that the connection of the drive mount to the base permits the drive to be swung up away from the base without upsetting its alignment with the hopper so that the underside of the drive is exposed to facilitate maintenance and repair of the drive. The apparatus is otherwise simple to operate, particularly in its automatic mode and it can operate reliably for a prolonged period without maintenance or repair. Therefore, it should greatly facilitate the sequential handling of a large number of diskettes in a reliable and efficient fashion.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
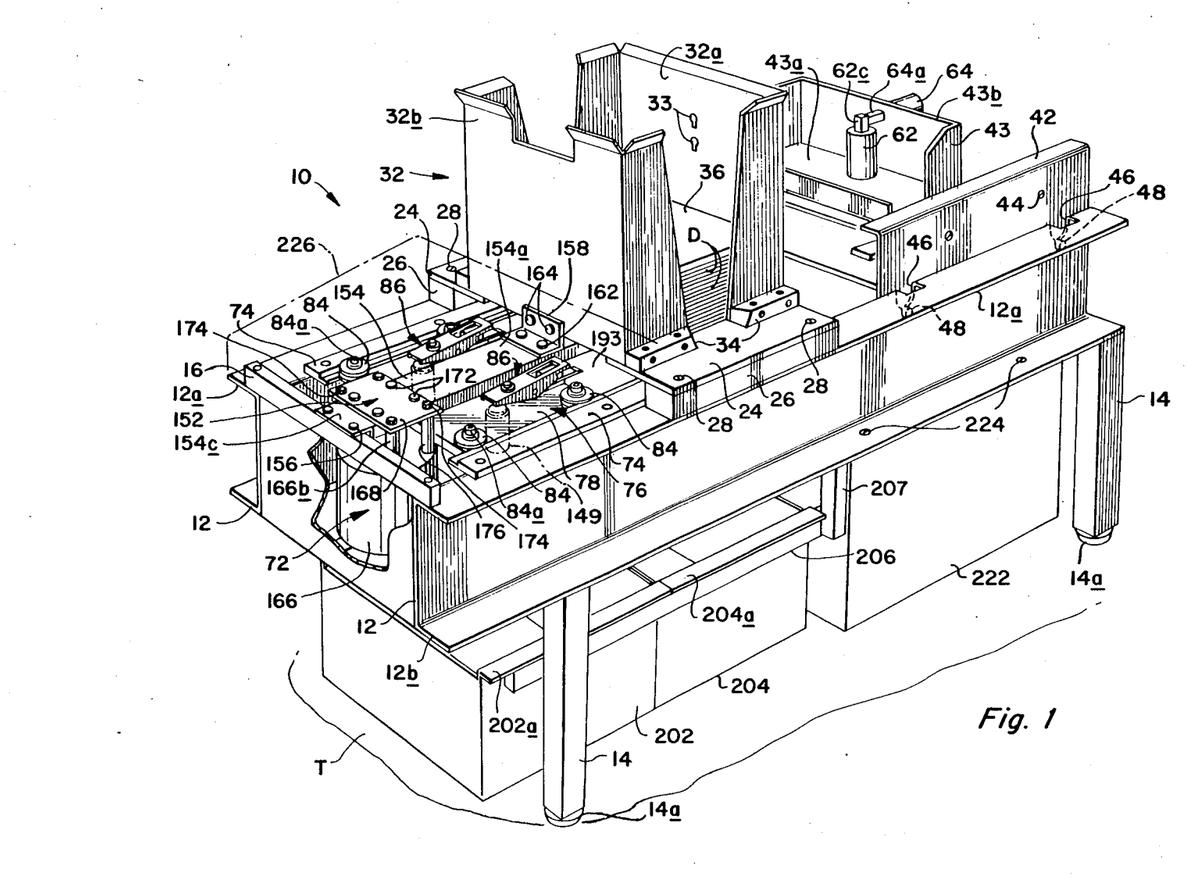
FIG. 1 is an isometric view with parts broken away showing a diskette transport apparatus embodying the principles of this invention.
Figure 2:
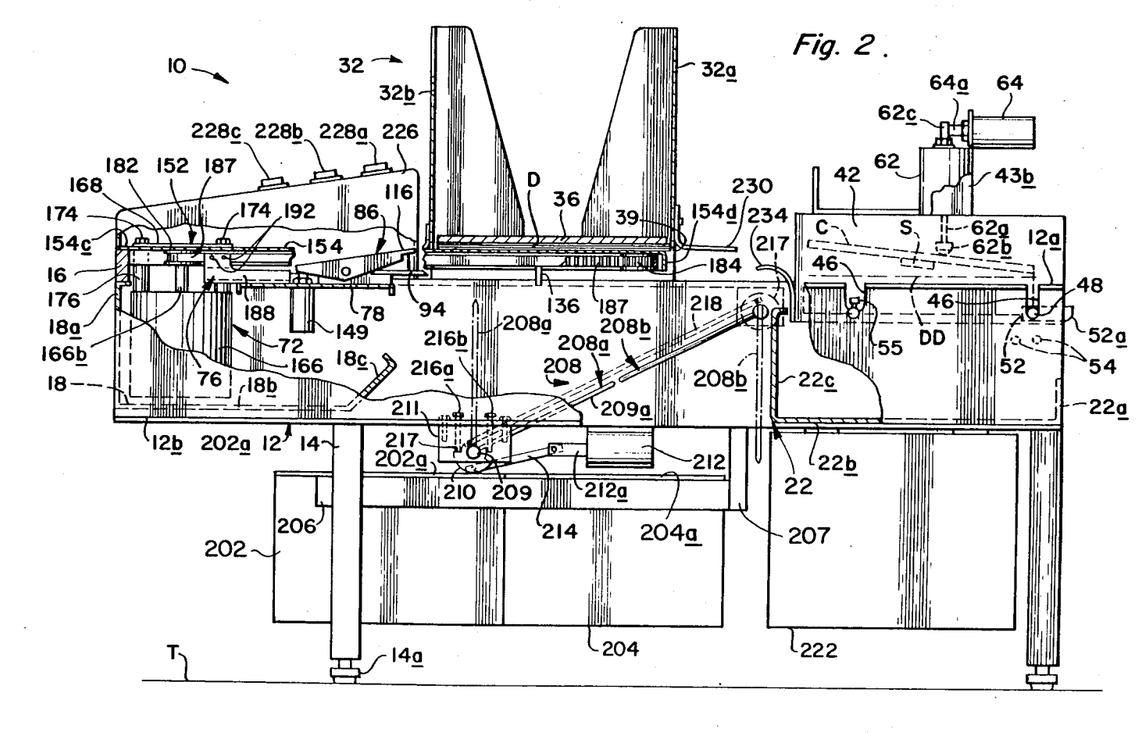
FIG. 2 is a side elevational view on a larger scale with parts broken away of the FIG. 1 apparatus.

Referring now to FIGS. 1 and 2 of the drawings, the transport apparatus indicated generally at 10 is supported more or less at waist level on a suitable horizontal surface such as a table T. The apparatus base comprises a pair of longitudinal channels 12 which are supported at an elevated position above table T by four legs 14. Screw-type levelers 14a are provided at the lower ends of those legs which can be adjusted so that the apparatus is more or less horizontal.

The left-hand ends of channels 12 are connected by a crossbar 16. Also extending between channels 12 at their left-hand end portions is a sheet metal pan 18 whose opposite ends are brazed to the sides of channels 12. As best seen in FIG. 2, pan 18 has a generally vertical segment 18a which extends down below crossbar 16 and a horizontal segment 18b which extends along the bottoms of channels 12 terminating in an upwardly angled segment 18c. A similar pan 22 connects the opposite end segments of channels 12. Pan 22 includes a vertical segment 22a at the ends of the channels, a horizontal segment 22b which runs along the bottoms of the channels and terminates in a vertical segment 22c which extends up almost to the tops of those channels. Thus, the pans 18 and 22 form bottom walls for the apparatus base except in a region more or less midway between the ends of channels 12 for reasons that will become apparent later. Preferably, the channels and pans are dip-brazed to form a unitary rigid base for the apparatus.

Mounted to the upper flange 12a a of each channel 12 is a rectangular plate 24 which is separated from the flange by a spacer block 26. Plate 24 and block 26 are secured to the channel flange by bolts 28 extending through appropriate openings in the plate and block and turned down into threaded openings in the channel flange 12a. The two plates 24 are positioned so that they extend parallel to the channels 12 with their inboard edges overhanging the inboard walls of the channels at a location therealong between the aforementioned pans 18 and 22.

The plates 24 support a hopper indicated generally at 32. The hopper comprises a right-hand or forward section 32a and a left-hand or rearward section 32b. The two hopper sections are more or less mirror images of one another, having a generally C-shaped cross section. They span the space between the two channels 12 and rest on the plates 24. They are spaced apart along the length of the channels so that they define a generally square hopper or magazine of a size to accommodate the largest size standard diskette, e.g. an eight inch diskette. Then, when the apparatus is used to transport smaller diskettes, an appropriately sized insert hopper is removably positioned in hopper 32. Such a smaller hopper formed with keys can be supported from hopper section 32a by way of the keyholes 33 shown in FIG. 1.

Rectangular blocks 34 are positioned against the side walls of the hopper sections and against the plates 24 with appropriate bolts connecting those side walls to the blocks and the blocks to the plates. A multitude of diskettes D can be stacked in the hopper 32 as shown, being supported therein by the inboard edge margins of the plates 24. The construction of the hopper in the foregoing fashion assures that the hopper sections 32a and 32b are oriented perpendicular to the plates 24 so that the disks are not bent or racked as they repose in the hopper.

Usually, the diskettes are pressed down toward the plates 24 by a weight 36 in the form of a metal plate having the same general shape as the diskettes. Also, to facilitate inserting the diskettes into the hopper and removing them from the hopper, the upper edges of the hopper sections 32a and 32b are flared outwardly as shown and the corresponding side walls of the hopper sections are spaced apart sufficiently to permit the operator's fingers to be inserted into the hopper 32 from the sides thereof. Finally, as best seen in FIGS. 3 and 4, the front wall of hopper section 32a is formed with a lateral slot 39 just above plates 24 to permit only the diskette D at the bottom of the stack to be slid out of the hopper 32.

Figure 3:
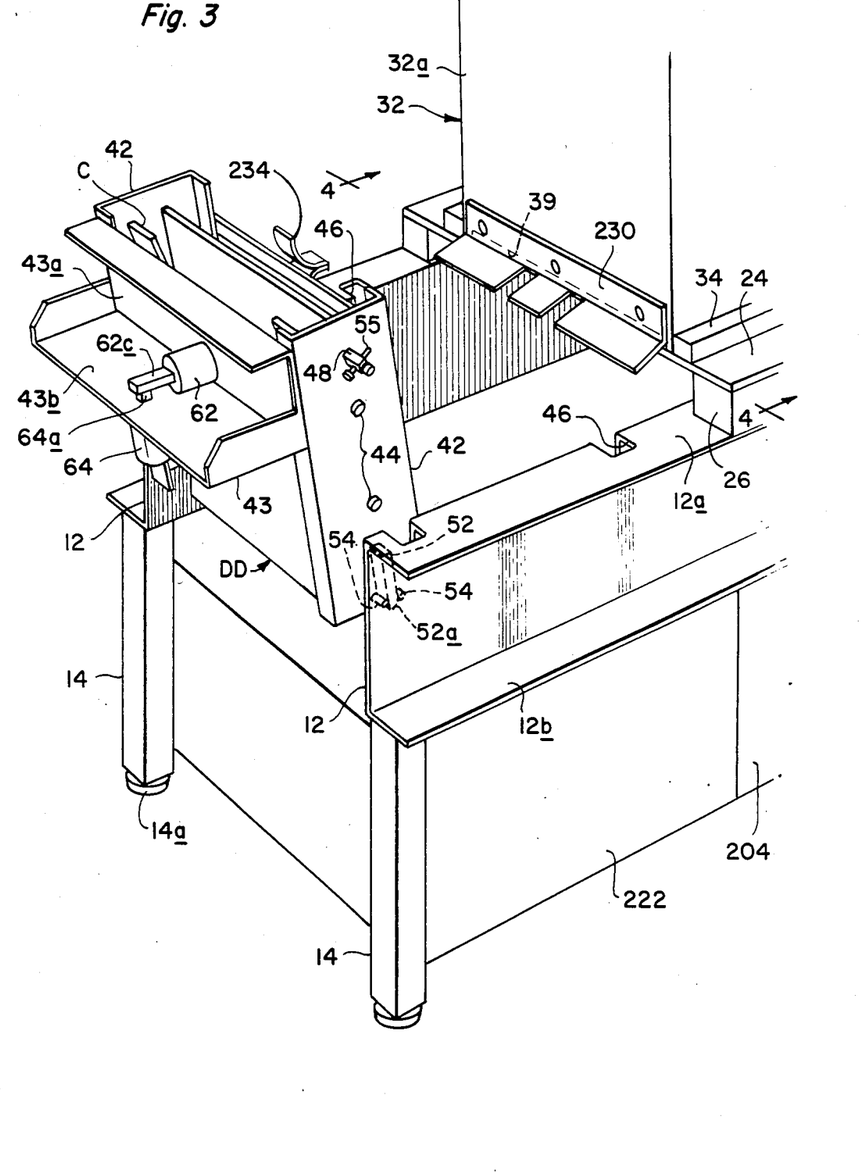
FIG. 3 is a fragmentary isometric view showing another part of the apparatus in greater detail.
Figures 4, 7:
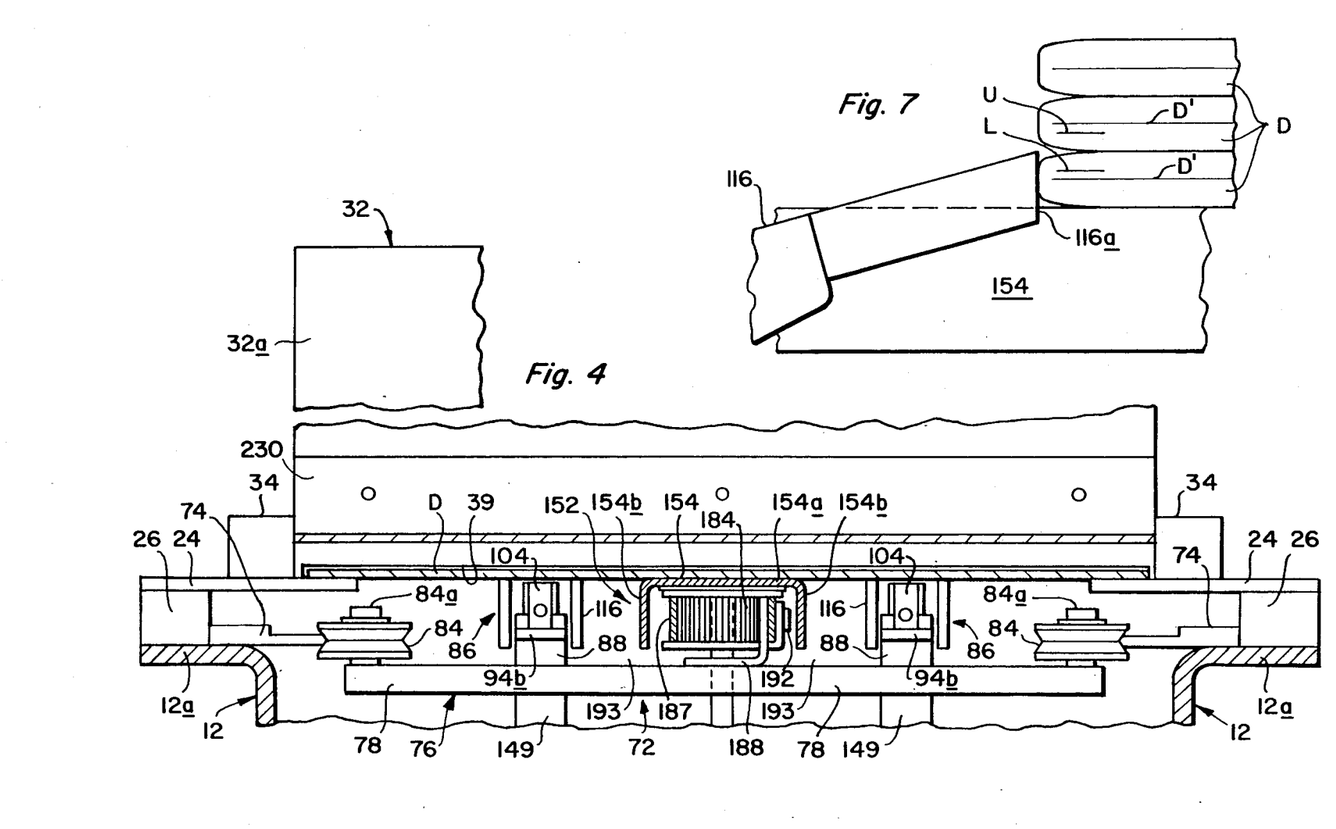
FIG. 4 is a sectional view along line 4—4 of FIG. 3.
FIG. 7 is a fragmentary elevational view on a much larger scale further illustrating the operation of the apparatus pickers.

Referring now to FIGS. 1 to 3, the apparatus specifically illustrated herein is intended to transport diskettes D one after the other automatically from hopper 32 to a disk drive for purposes of certification or evaluation. Such a disk drive indicated generally at DD is supported on channels 12 in line with hopper 32 and its slot 39. The disk drive DD may be any one of a variety of standard disk drives used for this purpose, an example being the Model 850 drive manufactured by Shugart Associates. Such a drive invariably has a front cover with a receiving slot which conducts the diskette to a swing-down diskette carrier shown at C in FIG. 2.

To accommodate the drive to the present apparatus, its front cover is removed and the disk drive is mounted between a pair of channels 42. These channels are secured to the drive by bolts 44 which extend through suitable openings in the channels into threaded openings invariably present in the side walls of the standard disk drive chassis. A formed metal bracket 43 spanning the drive connects the tops of channels 42, the channels and plates together comprising a mount for the drive. The channels 42 supporting the disk drive DD are positioned on channels 12 so that the working end of the disk drive faces and is aligned with the hopper 32. To this end, each channel 12 is provided with a pair of longitudinally spaced-apart vertical slots 46. These slots are arranged to receive pins 48 projecting out laterally from the channels 42 supporting the disk drive. The length of these pins varies depending upon the size of the disk drive being mounted, i.e. the narrower the drive, the longer the pins. Thus, to mount a particular disk drive DD to the apparatus 10, the drive is slid between channels 42 and anchored thereto by bolts 44. Then that assembly is simply dropped between the apparatus channels 12 so that the pins 48 are received in the slots 46. This automatically correctly positions the disk drive DD in alignment with the hopper 32 and its exit slot 39.

In the event it becomes necessary to substitute a different disk drive, say, for example, one capable of handling a different size diskette, the drive including its mounting channels 42 are simply lifted away from the apparatus base channels 12 and the replacement drive dropped into place on channels 12. Desirably, the drives that are to be associated with the apparatus 10 are stored nearby with their channels 42 already bolted to the drives so that the drives can be incorporated into the apparatus quickly and easily.

It is important to note that the illustrated mode of mounting the disk drive DD to apparatus 10 also gives ready access to the underside of the drive in the event that becomes necessary for repair or maintenance purposes. More particularly, the ends of channels 42 facing hopper 32 (and the drive itself) can be lifted up with the pins 48 at the opposite ends of rails 42 pivoting in their slots 46. This permits the drive to be swung up to the vertical position shown in FIG. 3, thereby completely exposing the underside of the drive. Preferably, that right-hand pair of pins 48 extends out from a small rectangular block 52 attached to chamber 42. Those blocks have end segments 52a that extend beyond the ends of channels 42. Also, a pair of spaced-apart bosses or detents 54 project in from the inner walls of channels 12 below those blocks 52.

As the disk drive DD is swung up toward its raised position shown in FIG. 3, the block segments 52a are swung down so that they engage between the corresponding pairs of detents 54 thereby maintaining the disk drive in that raised position. Preferably, the ends of the block segments 54a are rounded as shown in that figure so that, as the disk drive is swung to its open position, those segments engage the endmost detents and are wedged upwardly and then drop between the corresponding pairs of pins 54, thereby locking the drive in that open or raised position.

The unit can be returned to its operative position shown in FIG. 1 simply by lifting the drive slightly. This disengages the block segments 52a from detents 54, permitting the drive assembly to be swung down to its operating position illustrated in FIG. 1. The elevation of the front of the mounted drive relative to the base channels 12 can be adjusted by set screws 55 threaded through the left-hand pair of pins 48 and engaging the bottoms of the corresponding pair of slots 46 as shown in FIG. 2. Thus, the present apparatus not only permits the ready substitution of one disk drive for another, it also allows the drive being used to be repaired in a minimum amount of time. This helps to minimize the down time of the apparatus 10 as a whole.

Still referring to FIGS. 1 to 3, when, as here, the apparatus 10 is to be used to transport diskettes automatically to and from drive DD, means are provided to lower and raise the drive carrier C when loading diskettes into the drive or removing them therefrom. The carrier is arranged to swing between a raised loading position shown in FIG. 2 wherein the carrier is free to receive and release a diskette through an opening in the front of the drive and a lower operating position shown in FIG. 6F which brings the disk in the diskette into operative engagement with a rotative drive spindle S (FIG. 2) in the disk drive. Normally, the carrier C is biased toward its raised loading position. When swung to its operating position, the carrier is retained there by a manually-operated latch.

To load a diskette into the standard drive, the carrier is moved to its loading position and a diskette is pushed on edge into the carrier. The carrier includes a pair of spring-loaded slides. As the diskette is slid into the carrier, the diskette pushes the slides to a retracted position on the carrier where they are latched in preparation for ejecting the diskette when the carrier is next opened. After the diskette is seated in the carrier, the carrier is swung down to its operating position and latched. The disk in the diskette can now be rotated by spindle S and information written on or read from the diskette in the usual way. When it is desired to remove the diskette, the latch is released so that the carrier swings up to its loading position. This movement releases the spring-loaded slides which extend to push the diskette out of the carrier through the opening in the front of the drive.

To avoid having to operate the disk drive manually in the aforesaid manner, the front cover of the drive, along with its latch mechanism and the ejection slide springs are removed. This can be done quite easily using ordinary hand tools. The functions of the latch and the operator's fingers are assumed by a carrier closure mechanism mounted to bracket 43 above the drive. More particularly, bracket 43 includes a horizontal segment 43a and a vertical segment 43b. Mounted to segment 43a is a solenoid actuator 62. The actuator has an armature 62a (FIG. 2) which extends down through segment 43a terminating in a resilient knob 62b which bears against the disk drive carrier C.

The opposite end 62c of the armature 62 extends beyond the top of the solenoid coil. A second solenoid actuator 64 is mounted to bracket segment 43b so that its armature 64a overlies of armature 62. Normally, armature 62a is biased toward a retracted position, while armature 64a is biased toward an extended position so that armature 64a engages against the side of the upper end 62c of the armature 62. In order to move the carrier C to its lower operating position, the solenoid 62 is energized momentarily. This extends the armature 62a fully so that the armature pushes the carrier to its operating position. Preferably, solenoid 64 is energized momentarily also to remove any side load on armature 62a. The stroke and length of armature 62a are such that when it is fully extended, its upper end 62c just clears the end of solenoid armature 64a. This permits the latter armature to extend fully so that it overlies armature 62a, thereby latching armature 62a in its extended position, whereupon both solenoids can be de-energized.

When it is desired to move the disk drive carrier C to its raised loading position shown in FIG. 2, the solenoid 64 is energized momentarily so that it retracts from armature 62a permitting the latter armature to retract allowing carrier C to swing up. Preferably, solenoid 62 is energized momentarily also to extend armature 62a so that there is no side load on the retracting armature 64a. This pulsing of both solenoids at the same time to remove side loads on the actuators permits the use of smaller, less forceful solenoids. The solenoids which control the movement of the drive carrier are energized only momentarily when the diskette is loaded into and removed from the drive. Therefore, even though the solenoids are in reasonably close proximity to the magnetic disk component of the diskette, the magnetic fields generated by the solenoids are only present momentarily so that they do not cause dropouts or otherwise adversely affect the magnetic properties of the disk. Moreover, the solenoids do not become overheated which could result in damage to the solenoids themselves.

Referring now to FIGS. 1, 2 and 4, the diskettes D are transported from hopper 32 to the disk drive DD by a transport assembly indicated generally at 72. This assembly includes a pair of rails 74 which are bolted to the upper flanges 12a of channels 12. The rails extend from the left-hand end of channels 12, pass under hopper 32 to locations adjacent the inner ends of channels 42. The rails are in the form of flat strips having beveled edges which project toward one another inboard of channels 12.

Arranged to roll along rails 74 is a carriage shown generally at 76. This carriage comprises a generally rectangular plate 78 dimensioned to fit between the rails 74. A pair of grooved wheels 84 are rotatively mounted at the four corners of plate 72 so that the wheels at the opposite sides of the plate engage the adjacent rail knife edges, permitting the carriage to roll along the rails between a fully retracted or home position at the left-hand end of the apparatus illustrated in FIGS. 1, 2 and 6A and an advanced position best seen in FIG. 6E, wherein the carriage is positioned adjacent the disk drive DD.

In order to assure that there is no play in the movement of the carriage 76 along the rails and that the carriage travels parallel to the rails, the wheel axles 84a (FIG. 4) at one side of the carriage are movably mounted to plate 78 and biased outwardly toward the corresponding rail 74. The mounting of the wheel axles in this fashion can be accomplished in a variety of different known ways. For example, each movable wheel axle 84a can be mounted at one end of a short arm (not shown) whose opposite end is pivotally mounted to plate 78. Then the arm can be spring-biased to urge the wheel toward the rail.

The carriage plate 78 supports a pair of laterally spaced apart diskette pickers shown generally at 86. As will be described in detail later, when the carriage 76 moves from its home position illustrated in FIG. 2 to its advanced position shown in FIG. 6E, the pickers pick off only the lowest diskette D in hopper 32 and push that diskette into the disk drive carrier C so that a read and/or write operation can be performed on that diskette. Then, following completion of that operation on the diskette, when the carriage 76 is moved back toward its home position, the pickers 86 pull the diskette D out of the drive carrier and back underneath the hopper to a diskette receiving location below channels 12 as will be described later.

Figure 5A:
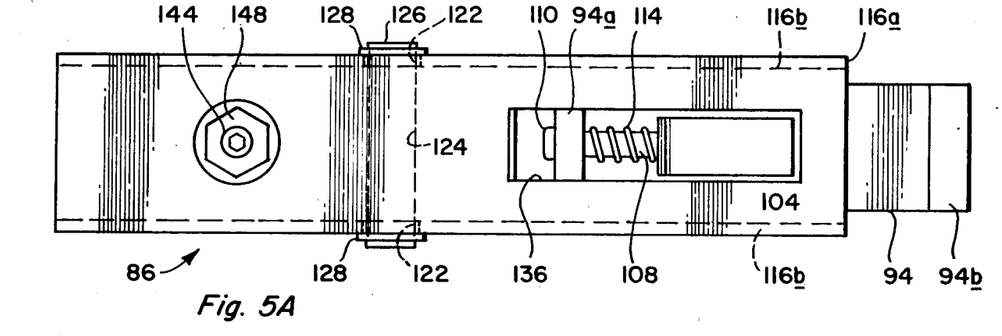
FIGS. 5A and 5B are top and longitudinal sectional views respectively on a large scale showing in detail the picker component of the FIG. 1 apparatus.
Figure 5B:
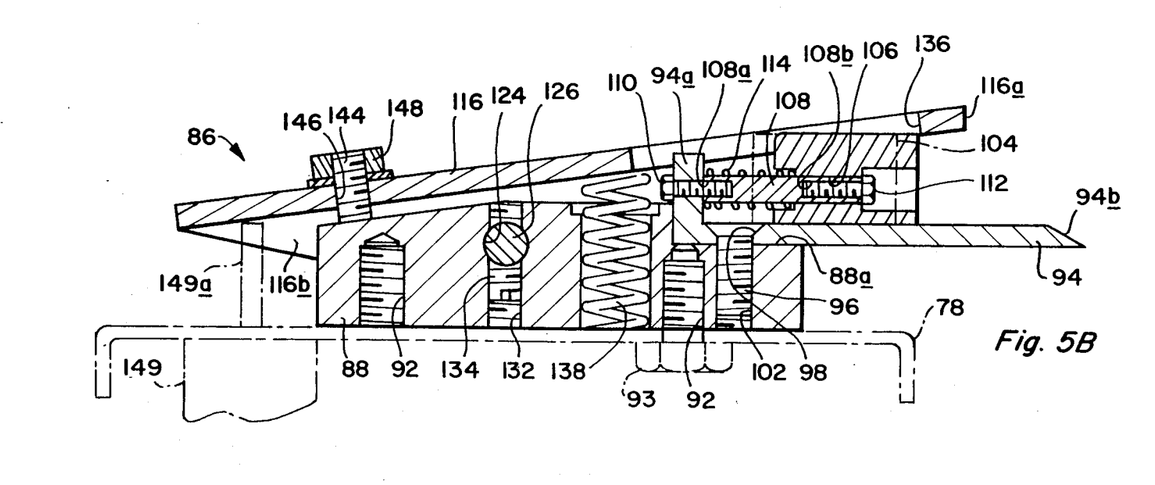

Referring now to FIGS. 5A and 5B, each picker 86 comprises a generally rectangular block 88. A pair of tapped passages 92 extend up from the bottom of the block to receive bolts 93 for anchoring the block 88 to carriage plate 78. The upper surface of block 88 is stepped at 88a a to accommodate a blade-like finger 94. The end of finger 94 adjacent the block terminates in an upwardly-extending tab 94a. The opposite end of the finger is formed as a knife edge or bevel 94b. Finger 94 is secured to block 88 by a screw 96 which extends through a countersunk opening 98 in finger 94 and is turned down into a threaded passage 102 in the block.

Slidably mounted on finger 94 is a small generally rectangular pusher block 104. A passage 106, counterbored at both ends, extends the length of block 104 and a post 108 extends from the finger tab 94a into passage 106. Threaded passages 108a and 108b extend into post 108 from its opposite ends. The end of post 108 adjacent tab 94a is secured to the tab by a set screw 110 which extends through an opening in that tab and is turned down into the threaded passage 108a. A similar screw 112 inserted into the counterbored passage 106 in block 104 is turned down into the post passage 108b thereby slidably mounting block 104 on post 108. A coil spring 114 is captured on post 108 between tab 94a and block 104 to urge the block toward an extended position shown in solid lines in FIG. 5B wherein it more or less overlies the left-hand end segment of finger 94. Block 104 is slidable on finger 94 to a retracted position shown in dotted lines in that same figure for reasons that will become apparent later.

Still referring to FIGS. 5A and 5B, a second finger 116 is pivotally mounted to block 88 so that the working end 116a of the finger can be moved toward and away from finger 94. More particularly, finger 116 is in the form of a formed metal shell having a pair of depending side walls 116b which extend down on opposite sides of block 88. A pair of openings 122 are formed in the finger side walls 116b which are aligned with a lateral opening 124 in block 88. A pair of nylon grommets or bearings 128 are press fit into these openings and a pivot pin or axle 126 extends through these bearings thereby pivotally connecting finger 116 to block 88. A vertical threaded passage 132 is formed in block 38 that intercepts passage 124. This enables a set screw 134 to be turned up into passage 132 so that it engages the pivot pin 126 thereby anchoring that pin to the block 88. A rectangular opening 136 is formed in finger 116 directly above block 104 and the finger tab 94a to provide clearance for those members when finger 116 is pivoted relative to the block.

As best seen in FIG. 5B, finger 116 is appreciably shorter than finger 94. It is swingable from a position shown in FIGS. 5B and 6A wherein the finger working end 116a is spaced appreciably above the finger 94 and wherein block 104 forms a vertical wall between the two fingers suitable for pushing against the edge of a diskette D and a closed or clamping position shown in FIG. 6G wherein the finger 116a lies adjacent 94 so that a diskette D can be clamped between the two fingers. Finger 116a is urged toward its open position by a coil spring 138 which is received in a vertical passage 142 in block 88, the spring being compressed between the top of the carriage plate 78 and the underside of finger 116. The actual spacing of the finger working end 116a above finger 94 in that open position is established by a set screw 144 which is turned down into a threaded passage 146 in finger 116 so that it contacts the top of block 88. The set position of screw 144 is maintained by a locking nut 148 threaded onto the upper end of that screw.

Finger 116 is swung to its closed position by a solenoid actuator shown in dotted lines at 149 in FIG. 5B. The solenoid is mounted to the underside of carriage plate 78 with its actuator 149a extending through a hole in the plate and engaging the underside of arm 116 adjacent set screw 144. When the solenoid is energized, the armature 149a extends thereby swinging finger 116 on its pivot at 126 so that the finger end 116a is urged toward finger 94.

As will be described in more detail later, when the carriage 76 is moving toward its advanced position to transport a diskette from hopper 32 to disk drive DD, the pickers 86 are in their open positions with their fingers spread apart so that the diskette is pushed from the hopper into the disk drive by finger 116 or block 104. On the other hand, when the carriage 76 is initially moving toward its home or retracted position, the pickers are in their closed positions so that their fingers 94 and 116 clamp onto the edge of the diskette enabling the diskette to be withdrawn from the disk drive.

Turning now to FIGS. 1, 2 and 4, the carriage 76 is moved between its retracted and advanced positions by a belt drive shown generally at 152 which is part of transport assembly 72. The belt drive comprises a long, thin, generally rectangular, shell-like housing 154 which extends from a location adjacent the left-hand ends of channels 12 to a location just beyond hopper 32. As best seen in FIG. 4, housing 154 has a flat top wall 154a and a pair of spaced-apart depending side walls 154b. The left-hand end of the top wall extends beyond the corresponding ends of the side wall forming a tab 154c which engages on the cross bar 16 extending between channels 12. The opposite ends of the housing side walls 154b are connected by an end wall 154d as shown in FIGS. 2 and 6C. The belt drive 152 is anchored to the remainder of the apparatus by a pair of bolts 156 (FIG. 1) extending through the housing tab 154c into threaded openings in the cross bar 16 and by a right-angle bracket 158 connected by fasteners 162 to the housing top wall 154a and by fasteners 164 to the wall of hopper section 32b.

As best seen in FIGS. 1 and 2, a reversible step motor 166 is suspended from the left-hand end of the drive housing 154. More particularly, a rectangular plate 168 is anchored by bolts 172 to the top of housing top wall 154a with the opposite side edges of that plate extending beyond the housing. Bolts 174 extend down through plate 168 outboard of housing 154 and into spacer sleeves 176 at the underside of the plate and which are threaded at both ends. Similar bolts extending from the motor housing are screwed into the lower ends of the sleeves so that the motor is suspended from the plate. The motor armature 166b extends up into housing 154 and carries a toothed pulley 182. As seen in FIGS. 2 and 4, a second toothed pulley 184 is rotatively mounted adjacent the opposite end of housing top wall 154a and a timing belt 187 in the form of an endless loop is stretched between the two pulleys 182 and 184.

As shown in FIG. 4, a bracket 188 projects up from carriage plate 78 adjacent to one stretch of the belt 187 and the belt is clamped to that bracket by screws 192. Thus, by appropriately stepping motor 166, the belt 187 can be moved in one direction or the other to move carriage 76 back and forth along its rails 74. As best seen in FIGS. 1 and 4, the belt drive housing 154 is considerably narrower than the spacing between plates 24. This leaves a pair of gaps 193 below the hopper for providing clearance for pickers 86 when the carriage 76 is moved between its two positions.

It will be seen from the foregoing that the belt drive 152 is a separable unit that is easy to incorporate into the apparatus. The drive is simply inserted between the channels 12 to the left of hopper 32 and secured by the fasteners 156 and 162 to cross member 16 and bracket 158 respectively. Therefore, the drive can be removed quite easily, if need be, in order to repair or replace belt 187 or motor 166. Also, the belt drive 152 can be adjusted easily so that it is collinear with the longitudinal centerline of the apparatus simply by loosening the bolts 156 and 162, shifting the drive accordingly and retightening those bolts. Likewise, the belt drive can be adjusted vertically by loosening the bolts 156 and placing appropriate shims (not shown) between tab 154c and the cross member 16. This adjustment should be such that the housing top wall 154a is coplanar with the upper surfaces of plates 24 to provide a flat surface to help support the stack of disks in the hopper 32 as shown in FIG. 4.

Since the illustrated apparatus 10 is being used to transport diskettes D to and from the disk drive DD for purposes of certification, it is desirable that the diskettes retrieved from the disk drive be routed to different receiving locations depending upon whether they pass or fail certification. Accordingly, as best shown in FIGS. 1 and 2, the apparatus 10 includes a pair of bins 202 and 204 positioned between the apparatus legs 14 below hopper 32. The bins are provided with flanges 202a and 204a by which the bins can be slidably suspended on a pair of rails 206 connected to the legs 14 and to posts 207 depending from channel flanges 12b at each side of the apparatus.

When the carriage 76 is moving toward its retracted position so as to pull a diskette from the disk drive, that diskette is dropped into bin 202 or 204 depending upon whether it passed or failed certification. The routing of that diskette is controlled by a gate mechanism indicated generally at 208 in FIG. 2. Gate mechanism 208 includes a lower gate 208a and an upper gate 208b. When the gates are in their solid line positions shown in FIG. 2 so that they form a slide, any diskette dropped from above will slide into bin 202. On the other hand, when the gates are in their dotted line positions shown in that figure, any such diskette will be dropped into bin 204. Thus, by properly controlling the gate positions, the diskettes which pass certification will be collected in bin 202, while those which fail will be collected in bin 204.

As shown in FIG. 2, the lower gate 208a comprises a rigid rod 209 having several rigid smaller rods or wires 209a projecting laterally from the rod. A pair of collars 210 are engaged onto the opposite ends of the rod to rotatively support the rod from a pair of brackets 211 extending down from the lower flanges 12b of channels 12. Suspended from one of the channel flanges 12b, i.e. the right-hand one, is a solenoid 212 whose actuator 212a is pivotally connected by a link 214 to the right-hand collar 210. When the actuator is in its extended position, gate 208a is in its solid line position shown in FIG. 2. On the other hand, when the solenoid is energized to retract its actuator, the gate 208a reposes in its dotted line position shown in that figure. The two positions of that gate may be established positively by adjustable set screws 216a and 216b threaded down through the channel flange 12b so as to engage appropriately located opposite end walls of a notch 217 formed in the right-hand collar 210.

The gate 208b is similar to gate 208a and is rotatively mounted in a similar fashion between the channels 12 adjacent the upper flanges thereof. A long link or rod 218 is pivotally connected at its opposite ends to the left-hand collars 210 of the two gates 208a and 208b so that gate 208b moves between its solid and dotted line positions along with gate 208a.

The apparatus power supply and control circuitry or controller are conveniently contained in a housing 222 suspended from channel flanges 12b below the disk drive DD. The control circuitry is quite standard and will not be detailed here. The signals required from the controllers and their timing are readily apparent from the apparatus operating sequence about to be described. The housing 222 is connected to the channels by only four bolts 224 (FIG. 1). Therefore, access is had to the power supply and other electrical circuits simply by unscrewing those bolts and moving the housing 222 out from under the channels 12.

As shown in FIG. 2, a control panel 226 is mounted to channels 12 above the home position of the carriage 76. The panel carries a series of buttons 228, namely, an AUTO button 228a, a LOAD button 228b and an UNLOAD button 228c, which initiate various apparatus operations to be described presently.

Figure 6A:
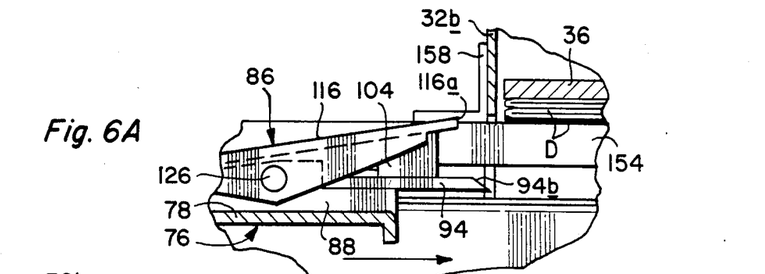
FIGS. 6A to 6H are fragmentary views on a large scale illustrating the operation of the present apparatus.
Figure 6B:
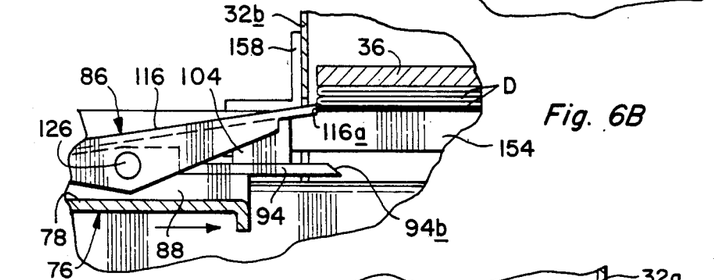
Figure 6C:
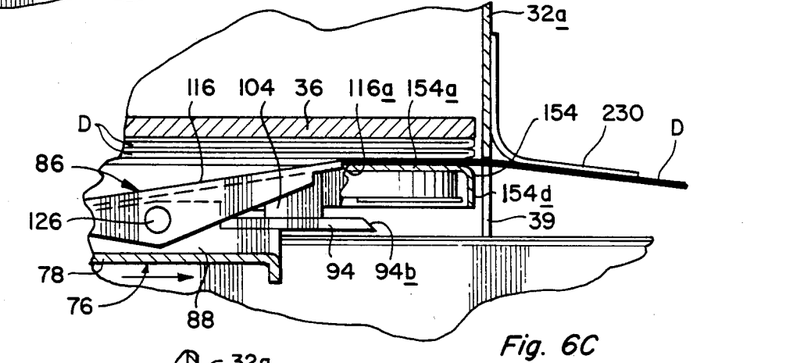

Referring now to FIGS. 6A to 6H, during operation of the apparatus, the carriage 76 reposes initially in its retracted or home position illustrated in FIG. 1 and the pickers 86 are in their open positions with their fingers 116 spaced above fingers 94. At this point also, the disk drive carriage C is in its open position illustrated in FIG. 1. The operator commences transporting diskettes D from the hopper to the disk drive by depressing the AUTO control button 228a and any required control buttons (not shown) on the disk drive DD or its ancillary controller. This causes the apparatus controller in the housing 222 to activate step motor 166 so that the motor advances carriage 76 toward the disk drive. As shown in FIGS. 6A and 6B, as the pickers approach the hopper, the working ends 116a of the picker fingers 116 are aligned with the lowest diskette D in the hopper 32. Therefore, the fingers 116 engage only that lowest disk D and push that diskette out of the hopper through the slot 39 in hopper section 32a as shown in FIG. 6C. As noted previously, the height of the working end 116a of the picker finger 116 can be controlled by adjustment of the set screw 144 (FIG. 5A).

Referring for a moment to FIG. 7, the edge of the diskette that is engaged by finger end 116a is actually tapered or rounded as shown in this drawing figure. Also, the dimensions of the diskettes may vary because the diskette dimensional tolerances are not very tight. Despite these factors, however, the present apparatus is able to pick off and push only the lowest diskette in the stack from the hopper in a reliable fashion. This is because the thickness of finger end 116a is slightly greater than the thickness of diskette D and the end face of the fingers are perpendicular to the diskette. This permits an appreciable variation in the relative vertical positions of the finger ends and the lowest diskette edge. More particularly, the lowest diskette can be displaced downwardly relative to the finger end 116a as long as the upper edge of the finger end is at or below an imaginary line U located slightly below the transverse centerline D' of the diskette above the lowest diskette. Likewise, the lowest diskette can be displaced upwardly relative to the finger as long as the upper edge of finger end 116a lies at or above an imaginary line L lying slightly above the transverse centerline D' of that lowest diskette D. This tolerance zone L-U is equal to the thickness of diskette D minus dL plus dU where dL and dU are the distances between centerlines D' and lines L and U respectively.

In a typical example, diskette D has a trailing edge thickness of 0.080 inch, finger end 116a has a thickness of 0.125 inch and dL and dU are each about 0.020 inch. Therefore, in this example, fingers 116 will reliably pick only the lowest diskette D in hopper 32 even if the vertical position of the lowest diskette in the hopper varies by as much as 0.040 inch. Although this tolerance band seems small in an absolute sense, one should appreciate that it is approximately equal to one-half of the total thickness of the diskette. Within these constraints, the pickers 86 will invariably pick the lowest, and only the lowest, diskette D from hopper 32 during each cycle of the carriage 76.

Figure 6D:
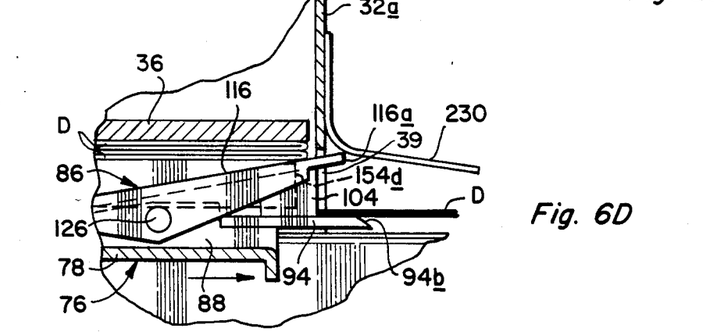

Referring now to FIGS. 4 and 6C, as long as any portion of the advancing diskette D lies inside the hopper, the diskette is maintained at an elevated position with its rear or trailing edge in line with the finger end 116a by plates 24 and the belt drive housing top wall 154a. However, as soon as the advancing diskette D clears the end wall 154d of the belt drive housing, the diskette D is free to drop down onto the lower picker fingers 94 as shown in FIG. 6D. To assure that the trailing edge of the diskette does indeed drop onto fingers 94 at the appropriate point in the course of its travel to the disk drive DD, a deflector 230 is mounted to the front wall of the hopper section 32a overlying the slot 39 therein. As the diskette D exits slot 39, it encounters the deflector 230 which biases the diskette slightly downwardly so that, as soon as the trailing edge of the diskette clears housing wall 154d, the diskette drops down onto picker fingers 94. Of course, the deflector is slotted to provide clearance for the pickers 86.

As the carriage continues to advance, the diskette D is now pushed along by the blocks 104 of the pickers as shown in FIG. 6D. As best seen in FIGS. 2 and 3, a guide plate 234 is mounted to the ends of the disk drive mount channels 42 facing the hopper. Plate 234 is curved such that a vertical gap is left between the opposing ends of deflector 230 and plate 234 as will permit the advancing diskette D to pass between them, its leading edge being supported by plate 234. Plate 234 thus helps to guide the diskette into the disk drive carrier C. As mentioned previously, that carrier may be aligned in the vertical direction with respect to the advancing diskette by means of the drive mount elevation-adjusting screws 55 (FIG. 2).

Figure 6E:
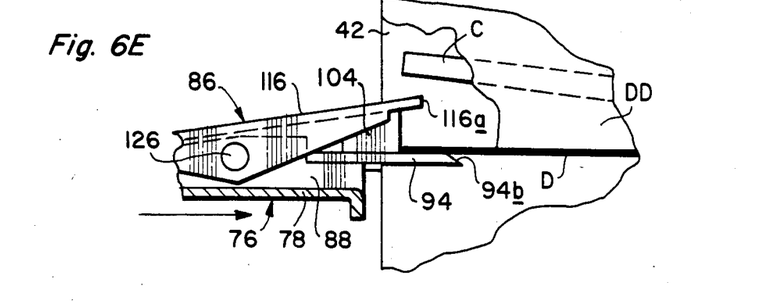

The advancing carrier 76 causes the pickers 86 and more particularly their blocks 104 to push the diskette D into the carrier C until it seats properly therein as illustrated in FIG. 6E. As noted previously, the blocks 104 are retractable to provide compliance so that the diskette D is seated properly despite small variations in the dimensions of the diskette and/or the spacing between the carrier and the pickers when the carriage 76 is in its fully advanced position.

Figure 6F:
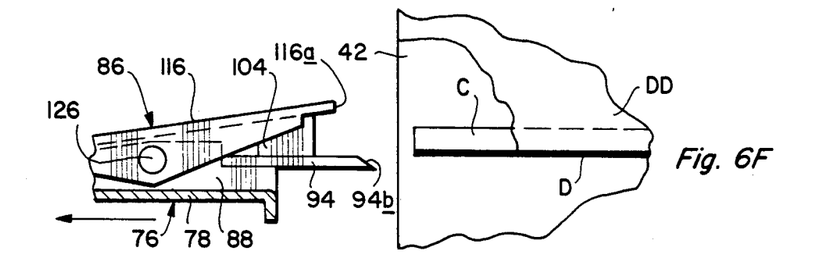
Figure 6G:
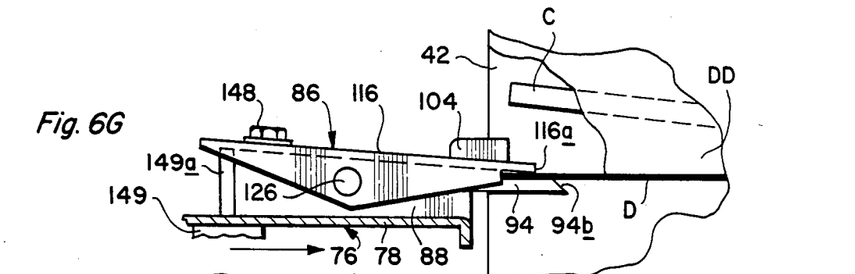
Figure 6H:
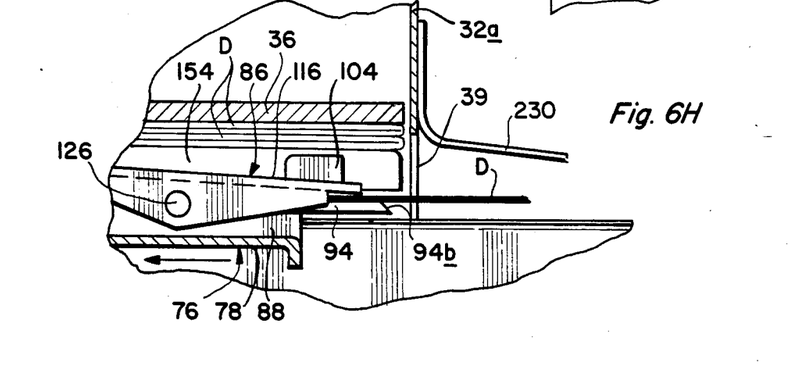

The apparatus controller then retracts the carriage 76 to a standby position as shown in FIG. 6F wherein the pickers 86 are clear of the disk drive. Then the controller energizes solenoids 62 and 64 so that the disk drive carrier C is moved to its closed position as shown in FIG. 6F. Now a read or write operation can be performed on the disk component of the diskette D such as for purposes of certification or evaluation. When that operation is completed, the disk drive and/or its ancillary controller issues a signal to the apparatus 10 controller in housing 222. That controller thereupon momentarily energizes solenoids 62 and 64 to open the disk drive carrier C and drives motor 166 to move the carriage 76 to its advanced position again so that the picker fingers 94 engage under the diskette D in carrier C. As noted previously, the working ends of the fingers 94 are tapered or beveled as shown to ensure that the fingers can slide under the diskette. Then the picker solenoids 149 are actuated to urge the pickers to their closed positions so that the edge of the diskette is clamped between the picker fingers 94 and 116 as shown in FIG. 6G. Next, the apparatus controller causes the stepper motor to operate in reverse to move the carriage 76 back toward its home position shown in FIG. 1. During the retraction of the carriage, the diskette is clamped against the lower picker fingers 94. Therefore, as shown in FIG. 6H, the diskette is free to pass under the plates 24 and the belt drive housing 154 supporting the diskette stack in housing 32.

When the carriage 76 reaches a selected location under hopper 32, the picker solenoids 149 are deenergized by the apparatus controller so that the pickers spring to their open positions, thereby releasing the diskette D. The diskette thereupon drops down into one or the other of the bins 202 and 204 depending upon the positions of gates 208a and 208b. The positions of these gates may be controlled by a signal from the disk drive in conjunction with its controller indicating whether the diskette in question passed or failed certification. For example, if the diskette passed certification, that control signal might cause the controller in housing 222 not to energize the gate solenoid 212 so that the gates repose in their solid line positions shown in FIG. 2. Resultantly, the diskette would drop down onto those gates and slide into bin 202. On the other hand, if the diskette failed certification, the control signal might cause the apparatus controller to energize solenoid 212 causing the gates to move to their dotted line positions shown in FIG. 2, with the result that the diskette would drop into bin 204.

To insure that the diskette is disengaged from the pickers at the appropriate time, a stripper pin 136 (FIG. 2) is mounted to the belt drive housing wall 154a. Pin 136 projects down into the path of travel of the retracting diskette so that, even if the pickers do not open, as soon as the leading edge of the diskette engages pin 136, the diskette is pushed out from between the clamping picker fingers 94 and 116 and drops down into bin 202 or 204 as noted above.

In the meantime, the carriage 76 is moved back to its fully retracted position shown in FIG. 1 in preparation for transporting the next diskette from hopper 32 to the disk drive DD. Assuming that the apparatus is operating in its automatic mode, the step motor 166 is operated to immediately advance the carriage again to pick and transport the now lowest diskette in the hopper to the disk drive as described above. The apparatus is arranged to cycle continuously as long as diskettes remain in hopper 32. An appropriate optical and/or feeler switch (not shown) is provided which detects when the hopper is empty so that the apparatus will stop after the last disk in the stack is certified and sorted as described above.

The apparatus can also be controlled to transport the diskettes D one at a time and semi-automatically between the hopper and the disk drive. That is, depression of the LOAD button causes the carriage to move from its home position to its fully advanced position so that a diskette is positioned in the disk drive and then to return to the standby position. Depression of the UNLOAD button causes the carriage to travel from that standby position to the advanced position to retrieve the diskette from the drive and then to move to the home position dropping the diskette into bin 202 or 204 on the way. If desired, additional control buttons can be provided to control each separate motion of the carriage for testing or diagnostic purposes.

The precise location of the carriage and the pickers thereon at each point in the operating cycle of the apparatus is controlled by the timing pulses applied to the step motor 166 from the controller in housing 222. However, in some cases, it may be desirable to monitor the actual location of the carriage at certain points in its path of travel. Thus, for example, it may be desirable to detect when the carriage 76 is in its home position shown in FIG. 1 and in its standby position illustrated in FIG. 6F. This can be accomplished by positioning appropriate feeler switches or photosensors (not shown) on fixed components of the apparatus which detect the presence or absence of the carriage at those locations. Also, it may be desirable to provide a signal which indicates whether the disk drive carrier C is in its open or closed position. Again, this can be accomplished by a conventional photosensor mounted to the disk drive mounting bracket 43 or at some other convenient location. These interlocks would prevent the transport apparatus from trying to push a diskette into the disk drive when the carrier C is in its lower operative position and from closing the drive carrier C before the pickers 86 are retracted from the drive.

It will be seen from the foregoing that the present apparatus 10 transports diskettes automatically in sequence from a hopper to a disk drive for purposes of certification or simply for a read or write operation. The apparatus disk drive mount assures that the drive is aligned properly with respect to the hopper to receive the diskettes. The mode of mounting a standard disk drive to the apparatus facilitates quick replacement of the drives in the event of a malfunction therein or when changing from one disk size to another.

The apparatus also automatically sorts the diskettes operated on by the disk drive depending upon whether they passed or failed certification or in some other manner that may be desired by the particular user of the apparatus. Finally, the unique mode of transporting the diskettes to and from the disk drive using the special pickers described herein moves the diskette into and out of the disk drive in a manner that more or less mimics the actions of an operator that is loading and unloading the diskette manually. Therefore, the diskettes are handled reliably, yet in a manner which causes essentially no damage to the diskette. Therefore, the apparatus should find wide acceptance in the marketplace.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. Diskette transport apparatus comprising
   A. a base;
   B. means mounted to the base for containing a vertical stack of diskettes;
   C. disk drive mounting means for mounting a disk drive, said mounting means being supported on the base at a location aligned with said containing means, said mounting means including
      (1) a support frame for attachment to the disk drive, and
      (2) coacting means on the support frame and said base which interfit so that said support frame is removably located at a selected position on the base in proper alignment with the containing means, said coacting means including a hinge that permits the frame and the disk drive supported thereby to be swung up away from the base so as to expose the underside of the disk drive; and D. diskette moving means which push the lowest diskette in the containing means into a disk drive mounted in the mounting means and then pulls the diskette from the disk drive back beneath the containing means to a receiving location.

2. The apparatus defined in claim 1 and further including
   A. a plurality of receptacles supported by said base at a receiving location beneath said containing means; and
   B. means for conducting each diskette being pulled by the moving means from said mounting means to one or another of said receptacles so as to sort the successive pulled diskettes.

3. The apparatus defined in claim 1 wherein the moving means comprise
   A. means mounted to the base defining a track extending in a straight line from the mounting means to a location beyond the containing means;
   B. a carriage mounted for movement along said track;
   C. means for moving the carriage between a retracted position at said location beyond the containing means and an advanced position adjacent to said mounting means;
   D. diskette picking means mounted to said carriage, said picking means being movable between
      (1) a first position as the carriage is moved toward its advanced position so that the picking means are aligned with and push against the edge of the lowest diskette in the containing means; and
      (2) a second position as the carriage is moved toward its retracted position so that the picking means are positioned entirely beneath the containing means and can pull that diskette beneath the diskettes remaining in the containing means.

4. Diskette transport apparatus comprising
   A. a base;
   B. means mounted to the base for containing a vertical stack of diskettes;
   C. disk drive mounting means for mounting a disk drive, said mounting means being supported on the base at a location aligned with said containing means; and
   D. diskette moving means which push the lowest diskette in the containing means into a disk drive mounted in the mounting means and then pulls the diskette from the disk drive back beneath the containing means to a receiving location, said moving means including
      (1) means mounted to the base defining a track extending in a straight line from the mounting means to a location beyond the containing means,
      (2) a carriage mounted for movement along said track,
      (3) means for moving the carriage between a retracted position at said location beyond the containing means and an advanced position adjacent to said mounting means, and
      (4) diskette picking means mounted to said carriage, said picking means
         a. being movable between a first position as the carriage is moved toward its advanced position so that the picking means project up to and through a plane defined by the containing means and are aligned with and push against the edge of the lowest diskette in the containing means and a second position as the carriage is moved toward its retracted position so that the picking means are positioned entirely beneath the containing means and can pull that diskette beneath the diskettes remaining in the containing means, and
         b. comprising at least one picker unit, each said unit including upper and lower fingers, each finger having an end, the end of the lower finger extending appreciably beyond the end of the upper finger, means for pivotally connecting the fingers so that they are movable relatively between an open position wherein their ends are spread apart and a closed position wherein their ends are in clamping relation and means for moving the fingers between said two positions, said finger moving means comprising spring means for biasing the fingers to said open position and electromagnetic actuating means for urging the fingers to said closed position.

5. The apparatus defined in claim 4 and further including abutment means positioned between said fingers at a location set back from the end of the upper finger so that as the carriage is moved toward its advanced position, the diskette is pushed by the upper finger until the diskette leaves the containing means and thereupon the diskette drops onto the lower finger so that it is pushed by said abutment means.

6. Diskette transport apparatus comprising
   A. a base;
   B. means mounted to the base for containing one or more diskettes;
   C. disk drive mounting means removably supported on the base at a location aligned with the containing means, said mounting means including
      (1) frame means vertically positionable on the base and for supporting a disk drive, and
      (2) means on the frame means and the base which coact so that the frame means are removably located at a selected position on the base in proper alignment with the containing means,
   D. means for moving the diskettes between the containing means and the mounting means;
   E. a plurality of receptacles supported by said base at a receiving location below said containing means; and
   F. means for conducting each diskette being pulled by the moving means from said mounting means to one or another of said receptacles so as to sort the successive pulled diskettes, said conducting means including
      (1) one or more gate means mounted to the base below the containing means and movable between at least two positions, in one of which positions the gate means define a path to one of said receptacles and in another of which positions, the gate means define a path to another of said receptacles, and
      (2) means for moving the gate means between said positions, said moving means including a solenoid, and means for adjustably defining the positions of the gate means.

7. The apparatus defined in claim 6 wherein the coacting means comprise
   A. means defining a plurality of openings in one of said frame means and said base; and B. a corresponding plurality of locating pins extending out from the other of said frame means and said base for being received in said openings.

8. The apparatus defined in claim 7 and further including means for adjusting the vertical position of said frame means relative to said base.

9. Diskette transport apparatus comprising
A. a base;
B. means mounted to the base for containing one or more diskettes;
C. disk drive mounting means supported on the base at a location on one side of the containing means;
D. means for moving the diskettes between the containing means and the mounting means, said moving means including diskette picking means
   (1) movable between an advanced location adjacent to the mounting means and a retracted location on an opposite side of the containing means from the mounting means, and
   (2) movable also between a diskette pushing position when the picking means are being moved from said retracted location toward said advanced location and a diskette pulling position when the picking means are being moved from said advanced location toward said retracted location;
E. first means for moving the picking means between its said retracted and advanced locations, said first moving means including
   (1) an endless belt,
   (2) means for movably mounting the belt to the base so that the belt extends under the containing means between said retracted and advanced locations,
   (3) means for connecting the picking means to the belt, and
   (4) a motor mounted to the base for moving the belt; and
F. second means for moving the picking means between said pushing and pulling positions.

10. Diskette transport apparatus comprising
A. a base;
B. means mounted to the base for containing one or more diskettes;
C. disk drive mounting means supported on the base at a location on one side of the containing means; and
D. means for moving diskettes between the containing means and the mounting means, said moving means including diskette picking means
   (1) movable between an advanced location adjacent to the mounting means and a retracted location on an opposite side of the containing means from the mounting means,
   (2) movable also between a diskette pushing position when the picking means are being moved from said retracted location toward said advanced location and a diskette pulling position when the picking means are being moved from said advanced location toward said retracted location, and
   (3) comprising at least one picker unit, each said picker unit including
      a. upper and lower fingers, each finger having an end, the end of the lower finger extending appreciably beyond the end of the upper finger,
      b. means for pivotably connecting the fingers so that they are movable relatively between an open position wherein their ends are spread apart and a closed position wherein their ends are in clamping relation,
      c. first means for moving said picking means between their said retracted and advanced locations, and
      d. second moving means for moving the picking means between said pushing and pulling positions, said second moving means including spring means for biasing the fingers to said open position, and electromagnetic actuating means for urging the fingers to said closed position.

11. The apparatus defined in claim 10 and further including abutment means positioned between said fingers at a location set back from the end of the upper finger so that as the picking means are moved toward said advanced location, the diskette is pushed by the upper finger until the diskette leaves the containing means and thereupon the diskette drops onto the lower finger so that it is pushed by said abutment means.

12. The apparatus defined in claim 11 and further including means for mounting the abutment means to the picking means for resilient movement along between the fingers.

13. The apparatus defined in claim 10 and further including means for adjustably setting said open position of the fingers.

14. The apparatus defined in claim 10 wherein the end of the lower finger is beveled so that it can slide easily under a diskette.

15. The apparatus defined in claim 10 and further including
A. means defining a diskette receiving location below said containing means; and
B. an abutment located above said receiving location in the path of travel of a diskette being pulled by said picking means toward said retracted location so that the diskette is pulled from between said fingers and can fall toward said receiving location.

16. The apparatus defined in claim 10 and further including
A. a diskette exit slot formed in the containing means and facing the mounting means; and
B. diskette deflecting means overlying said slot for urging diskettes exiting said containing means through said slot downward so that each such diskette assuredly falls onto the lower finger of each picking unit as the picking means move to said advanced location.

17. The apparatus defined in claim 10 wherein in each picking unit
A. said upper finger is movable and said lower finger is fixed; and
B. said upper finger is mounted so that when the fingers are in said open position, the upper finger projects into said containing means and, when the fingers are in said closed position, the upper finger is located entirely below said containing means.

* * * * *